(12) United States Patent
Campin

(10) Patent No.: US 6,598,973 B2
(45) Date of Patent: Jul. 29, 2003

(54) SPATIAL FILTER FOR ENHANCING HARTMANN-SHACK IMAGES AND ASSOCIATED METHODS

(75) Inventor: John Alfred Campin, Orlando, FL (US)

(73) Assignee: Alcon, Inc., Hunenberg (CH)

( * ) Notice: Subject to any disclaimer, the term of this patent is extended or adjusted under 35 U.S.C. 154(b) by 0 days.

(21) Appl. No.: 09/842,264

(22) Filed: Apr. 25, 2001

(65) Prior Publication Data
US 2002/0027640 A1 Mar. 7, 2002

Related U.S. Application Data

(60) Provisional application No. 60/199,562, filed on Apr. 25, 2000.

(51) Int. Cl.⁷ .................................. A61B 3/10
(52) U.S. Cl. ........................ 351/221; 382/254
(58) Field of Search ................ 351/200, 205, 351/206, 221, 246, 212; 382/128, 254, 255, 260, 276

(56) References Cited

U.S. PATENT DOCUMENTS

| | | |
|---|---|---|
| 4,725,138 A | 2/1988 | Wirth et al. |
| 4,750,818 A | 6/1988 | Cochran |
| 5,221,834 A | 6/1993 | Lisson et al. |
| 5,526,446 A * | 6/1996 | Adelson et al. ............. 382/260 |
| 5,684,545 A | 11/1997 | Dou et al. |
| 5,777,719 A * | 7/1998 | Williams et al. ............ 351/212 |
| 5,822,035 A | 10/1998 | Bille |
| 5,825,476 A | 10/1998 | Abitol et al. |
| 5,841,511 A | 11/1998 | D'Souza et al. |
| 5,929,970 A * | 7/1999 | Mihashi ..................... 351/205 |
| 6,047,091 A | 4/2000 | Anderson |
| 6,055,340 A * | 4/2000 | Nagao ........................ 382/261 |
| 6,095,651 A * | 8/2000 | Williams et al. ............ 351/246 |
| 6,373,992 B1 * | 4/2002 | Nagao ........................ 382/254 |

FOREIGN PATENT DOCUMENTS

| | | |
|---|---|---|
| WO | WO 99/27334 | 6/1999 |
| WO | WO 00/10448 | 3/2000 |
| WO | 00/19885 | 4/2000 |

OTHER PUBLICATIONS

Weeks, Jr., Arthur R., Fundamentals of Electronic Image Processing, 1996, IEEE Press, pp. 71, 129–144.*

Wallner, Edward P., "Comparison of Wavefront Sensor Configurations Using Optimal Reconstruction and Correction," San Diego, Aug. 25, 1982, Proceedings of SPIE, vol. 351, pp. 42–53.

Hamam, H., "A Direct Technique for Calculating the Profile of Aberration of the Eye Measured by a Modified Hartmann–Shack Apparatus," *Optics Communiations 173*, Oct. 1999, pp. 23–36.

Liang, et al., "Aberrations and Retinal Image Quality of the Normal Human Eye," *J. Opt. Soc. Am. A*, vol. 14, No. 11, Nov. 1997, pp. 2873–2883.

* cited by examiner

*Primary Examiner*—Marvin M. Lateef
*Assistant Examiner*—John R. Sanders
(74) *Attorney, Agent, or Firm*—Allen, Dyer, Doppelt, Milbrath & Gilchrist, P.A.

(57) ABSTRACT

A system and method improve a quality of sensor image data from a wavefront emanating from an eye. The sensor image data include a pixel array of intensities. A filter array is populated with a coefficient at each position of the array and the filter array is applied to each position in the pixel array. The system includes a process and a software package adapted to perform the above method steps.

34 Claims, 10 Drawing Sheets

SPATIAL FILTER FOR ENHANCING HARTMANN-SHACK IMAGES AND ASSOCIATED METHODS

CROSS-REFERENCE TO RELATED APPLICATION

This application claims priority from commonly owned provisional application Ser. No. 60/199,562, filed Apr. 25, 2000, "Spatial Filtering to Enhance Hartmann-Shack Images."

BACKGROUND OF THE INVENTION

1. Field of the Invention

The present invention relates to systems and methods for performing objective measurements of a visual system, and, more particularly, to such a system and method for enhancing data from a Hartmann-Shack image.

2. Description of Related Art

Optical systems having a real image focus can receive collimated light and focus it at a point. Such optical systems can be found in nature, e.g., human and animal eyes, or can be manmade, e.g., laboratory systems, guidance systems, and the like. In either case, aberrations in the optical system can affect the system's performance. By way of example, the human eye will be used to explain this problem.

A perfect or ideal eye diffusely reflects an impinging light beam from its retina through the optics of the eye, which includes a lens and a cornea. For such an ideal eye in a relaxed state, i.e., not accommodating to provide near-field focus, reflected light exits the eye as a sequence of plane waves. However, an eye typically has aberrations that cause deformation or distortion of reflected light waves exiting the eye. An aberrated eye diffusely reflects an impinging light beam from its retina through its lens and cornea as a sequence of distorted wavefronts.

There are a number of technologies that attempt to provide the patient with improved visual acuity. Examples of such technologies include remodeling of the cornea using refractive laser surgery or intra-corneal implants, adding synthetic lenses to the optical system using intra-ocular lens implants, and precision-ground spectacles. In each case, the amount of corrective treatment is typically determined by placing spherical and/or cylindrical lenses of known refractive power at the spectacle plane (approximately 1.0–1.5 cm anterior to the cornea) and literally asking the patient which lens or lens combination provides the clearest vision. This is an imprecise measurement of true distortions in the reflected wavefront because (1) a single spherocylindrical compensation is applied across the entire wavefront; (2) vision is tested at discrete intervals (i.e., diopter units) of refractive correction; and (3) subjective determination by the patient is made in order to determine the optical correction. Thus conventional methodology for determining refractive errors in the eye is substantially less accurate than the techniques now available for correcting ocular aberrations.

One method of measuring ocular refractive errors is disclosed in U.S. Pat. No. 5,258,791 to Penney et al. for "Spatially Resolved Objective Autorefractometer," which teaches the use of an autorefractometer to measure the refraction of the eye at numerous discrete locations across the corneal surface. Penney '791 further teaches the use of autorefractometer measurements in determining an appropriate corneal surface reshaping to provide emmetropia, a condition of a normal eye when parallel beams or rays of light are focused exactly on the retina and vision is perfect.

By way of example, one method and system known in the art are disclosed by Junzhong Liang et al. in "Objective Measurement Of Wave Aberrations of the Human Eye with the Use of a Hartmann-Shack Wave-Front Sensor" [*J. Opt. Soc. Am.* 11(7), July 1994, pp 1949–57]. Liang et al. teach the use of a Hartmann-Shack wavefront sensor to measure ocular aberrations by measuring the wavefront emerging from the eye by the retinal reflection of a focused laser light spot on the retina's fovea. The actual wavefront is reconstructed using wavefront estimation with Zernike polynomials. A parallel beam of laser light passes through beam splitters and a lens pair, which brings the beam to a focus point on the retina by the optics of the eye. Possible myopia or hyperopia of the tested eye is corrected by movement of a lens within the lens pair. The focused light on the fovea is then assumed to be diffusely reflected and acts as a point source located on the retina. The reflected light passes through the eye and forms a distorted wavefront in front of the eye that results from the ocular aberrations. The aberrated wavefront is then directed to the wavefront sensor.

The Hartmann-Shack wavefront sensor disclosed by Liang et al. includes two identical layers of cylindrical lenses with the layers arranged so that lenses in each layer are perpendicular to one another, as further disclosed in U.S. Pat. No. 5,062,702 to Bille. In this way, the two layers operate as a two-dimensional array of spherical lenslets that divide the incoming light wave into subapertures. The light through each subaperture is brought to focus in the focal plane of the lens array where a charge-coupled-device (CCD) image module resides.

The system of Liang et al. is calibrated by impinging an ideal plane wave of light on the lenslet array so that a reference or calibrating pattern of focus spots is imaged on the CCD. Since the ideal wavefront is planar, each spot related to the ideal wavefront is located on the optical axis of the corresponding lenslet. When a distorted wavefront passes through the lenslet array, the image spots on the CCD are shifted with respect to a reference pattern generated by the ideal wavefront. Each shift is proportional to a local slope, i.e., partial derivatives of the distorted wavefront, which partial derivatives are used to reconstruct the distorted wavefront, by means of modal wavefront estimation using Zernike polynomials.

However, the system disclosed by Liang et al. is effective only for eyes having fairly good vision. Eyes that exhibit considerable myopia (near-sightedness) cause the focus spots to overlap on the CCD, thereby making local slope determination practically impossible for eyes having this condition. Similarly, eyes that exhibit considerable hyperopia (farsightedness) deflect the focus spots such that they do not impinge on the CCD, thereby again making local slope determination practically impossible for eyes having this condition.

Various embodiments of a method and system for objectively measuring aberrations of optical systems by wavefront analysis have been disclosed in commonly owned application Ser. No. 09/566,668, "Apparatus and Method for Objective Measurement and Correction of Optical Systems Using Wavefront Analysis," filed May 8, 2000, which is hereby incorporated by reference herein. In this invention, an energy source generates a beam of radiation. Optics, disposed in the path of the beam, direct the beam through a focusing optical system (e.g., the eye) that has a rear portion (e.g., the retina) that provides a diffuse reflector. The beam is diffusely reflected back from the rear portion as a wavefront of radiation that passes through the focusing optical system to impinge on the optics. The optics project the wavefront to a wavefront analyzer in direct correspondence with the wavefront as it emerges from the focusing optical system. A wavefront analyzer is disposed in the path of the wavefront projected from the optics and calculates distortions of the wavefront as an estimate of ocular aberrations of the focusing optical system. The wavefront analyzer includes a wavefront sensor coupled to a processor that analyzes the sensor data to reconstruct the wavefront to include the distortions thereof.

A perfectly collimated light beam (i.e., a bundle of parallel light rays, here a small-diameter, eye-safe laser beam) incident on a perfect, ideal emmetropic eye, focuses to a diffraction-limited small spot on the retina. This perfect focusing is true for all light rays passing through the entrance pupil, regardless of position. From the wavefront perspective, the collimated light represents a series of perfect plane waves striking the eye. The light emanates from an illuminated spot on the retina as wavefronts exiting as a series of perfect plane waves, which are directed onto a wavefront analyzer for measuring distortions from ideality.

In one embodiment, the radiation is optical radiation and the wavefront sensor is implemented using a plate and a planar array of light-sensitive cells. The plate is generally opaque but has an array of light-transmissive apertures that selectively let impinging light therethrough. The plate is disposed in the path of the wavefront so that portions of the wavefront pass through the light-transmissive apertures. The planar array of cells is arranged parallel to and spaced apart from the plate by a selected distance. Each portion of the wavefront passing through one of the light-transmissive apertures illuminates a geometric shape covering a unique plurality of cells.

The wavefront optical path relays the re-emitted wavefront from the corneal plane to an entrance face of a Hartman-Shack wavefront sensor. The wavefront incident on the sensor is received by a sensitive charged-coupled-device (CCD) camera and an optical plate containing an array of lenslets. The lenslet array is parallel to the CCD detector face, with a distance therebetween approximately equal to the focal length of each lens in the lenslet array. The lenslet array divides the incoming wavefront into a matching array of "wavelets," each of which focuses to a small spot on the CCD detector plane. The constellation of wavelet spots in the CCD is used to reconstruct the shape of the incident wavefront. Collimated light striking the lenslet at normal (perpendicular) incidence would focus to the spot on the CCD face where this optical axis intersects. The optics of the apparatus provides such collimated light to the wavefront sensor using a calibration optical path.

In the case of a reflected aberrated wavefront, light focuses to a spot displaced from the collimated reference point by a distance $D_x$. The distance from the lenslet face to the CCD surface, $D_z$, is precisely known. Therefore, dividing the measured displacement, $D_x$, by the known propagation distance, $D_z$, the slope of the wavefront at the location of this lens element is determined. The same calculation is applied in the y direction within the plane, and the entire process applied to every lenslet element irradiated by the wavefront. A mathematical algorithm is then applied to reconstruct the wavefront shape consistent with the calculated $D_x/D_z$ and $D_y/D_z$ slope data. Regardless of which wavefront sensor is used, the distance between the planar array of cells and the opaque plate, or the array of lenslets, can be varied to adjust the slope measurement gain of the wavefront sensor and thereby improve the dynamic range of the system.

Another measure of dynamic range enhancement is provided by the focusing optics. The focusing optics includes first and second lenses maintained in fixed positions in the path of the beam and wavefront. An arrangement of optical elements is disposed between the lenses in the path of the beam and the wavefront. The optical elements are adjustable to change the optical path length between the lenses. If an optical correction is desired, the distortions are converted to an optical correction, which, if placed in the path of the wavefront, causes the wavefront to appear approximately as a plane wave. The optical correction can be in the form of a lens or an amount of corneal material ablated from the eye.

SUMMARY OF THE INVENTION

It is therefore an object of the present invention to provide a system and method for filtering sensor image wavefront data from an irradiated eye.

It is a further object to provide such a system and method applicable to Hartmann-Shack images.

It is another object to provide such a system and method for removing noise in the image data.

It is an additional object to provide such a system and method for removing speckle in the image.

It is yet a further object to provide such a system and method for filtering out nonuniform background noise.

It is yet another object to provide such a system and method useful in analyzing highly aberrated eyes.

These and other objects are achieved by the present invention for improving a quality of sensor image data from a wavefront emanating from an eye. The sensor image data comprise a pixel array of intensities. The method comprises the steps of populating a filter array with a coefficient at each position of the array and applying the filter array to each position in the pixel array. The system comprises a processor and a software package adapted to perform the above method steps.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
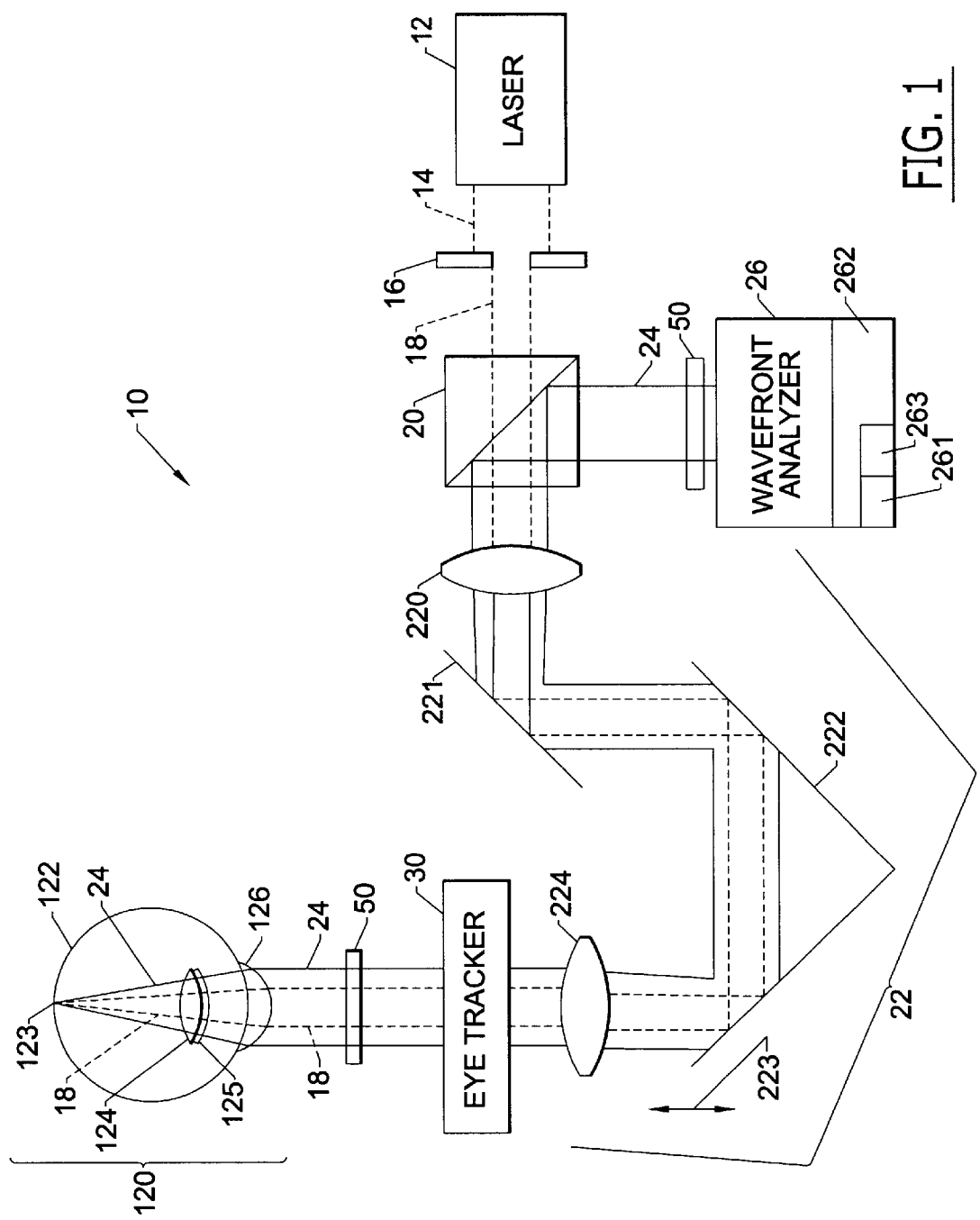
FIG. 1 is a simplified schematic of the system for determining ocular aberrations in accordance with the present invention.

A description of the preferred embodiments of the present invention will now be presented with reference to FIGS. 1–13.

By way of illustrative example, the present invention will be described with respect to diagnosing and correcting a human eye. However, it is to be understood that the teachings of the present invention are applicable to any optical system having a real image focus that can be, or can be adapted to diffusely reflect a focused spot of radiation from a rear portion of the optical system back through the optical system as a wavefront of radiation. Thus the present invention can be used with human or animal eyes of patients that may be alive or dead, or any man-made optical system.

Correction of the human eye may be used in conjunction with or based upon the diagnostic information provided by embodiments of the present invention, including the use of lasers that photoablate corneal tissue through the use of broad beam excimer lasers such as are well known in the art.

A method of using wavefront analysis to determine an appropriate optical correction has been described in previously referenced application Ser. No. 09/566,668. As described therein with reference to an ideal eye the ideal emmetropic or perfect eye diffusely reflects an impinging light beam from the back of its retina (i.e., the fovea centralis) through the eye's optics, which includes a lens and cornea. For such an ideal eye in a relaxed state, i.e., not accommodating to provide near-field focus, the reflected light exits the eye as a sequence of plane waves. However, a typical eye normally has aberrations that cause deformation or distortion of a reflected wave exiting the eye, where the aberrated eye diffusely reflects an impinging light beam from the back of its retina. For the aberrated eye, the reflected light exits the eye as a sequence of distorted wavefronts described mathematically as W(x,y).

One method of measuring distortions in the wavefront is by determining a spatial separation $\Delta z$ between a reference plane (by way of example, a plane analogous to the ideal wavefront) at a known distance $Z_0$ from the eye at each (x,y) point of the distorted wavefront as the leading edge of the wavefront traverses the distance $z_0$. This is described mathematically as:

$$\Delta z(x,y) = z_0 - W(x,y) \quad (1)$$

These $\Delta z$ measurements define optical path differences due to aberrations in the eye being tested, by way of example. An appropriate correction consists of removing these optical path differences.

Depending on the desired corrective therapy (corneal tissue ablation, synthetic lens addition, by way of example), the amount of material removed or added at each (x,y) coordinate can be calculated directly if the refractive index of the material in question is known. For many procedures, such as intra-ocular lens implantation or radial keratotomy, a wavefront analysis may be performed repetitively during a procedure to provide feedback information as to the appropriate endpoint of the procedure.

In order to perform wavefront analysis, the amount of spatial separation of component portions of a wavefront relative to the corresponding component portions of the planar or ideal wavefront is measured. It is the system and method of the present invention that allows such separation to be objectively and accurately measured for even substantially aberrated eyes, including those exhibiting severe defects such as severe myopia or hyperopia.

For the evaluation or measurement portion of the present invention, the patient's pupil should ideally be dilated to approximately 6 mm or more, i.e., the typical size of a human pupil in low light. Smaller amounts of dilation or no dilation at all may also evaluated or measured. In this way, the eye is evaluated while it is using the greatest area of the cornea so that any correction developed from such measurement takes into account the largest usable corneal area of the patient's eye. A lesser amount of the cornea is used in daylight where the pupil is considerable smaller, e.g., on the order of 3 mm. Dilation can be brought about naturally by implementing the measurement portion of the present invention in a low light environment such as a dimly lit room. Dilation can also be induced through the use of pharmacologic agents.

Referring now to FIG. 1, a simplified schematic of one exemplary embodiment of the apparatus 10 of the present invention is illustrated. The apparatus 10 includes a laser 12 for generating optical radiation used to produce a small-diameter laser beam 14. The laser 12 generates a collimated laser light beam (represented by dashed lines for the beam 14) of a wavelength and power that is eye-safe. For ophthalmic applications, appropriate wavelengths would include the entire visible spectrum and the near-infrared spectrum. By way of example, appropriate wavelengths may be in a range of from approximately 400–100 nm, including 550-, 650-, and 850-nm useful wavelengths. While operation in the visible spectrum is generally desired, since these are the conditions in which the eye operates, the near-infrared spectrum may offer advantages in certain applications. For example, the patient's eye may be more relaxed if the patient does not know the measurement is taking place. Regardless of the wavelength of the optical radiation, power should be restricted in ophthalmic applications to eye-safe levels. For laser radiation, appropriate eye-safe exposure levels can be found in the *U.S. Federal Performance Standard for LaserProducts*. If the analysis is to be performed on an optical system other than the eye, the examination wavelength range logically should incorporate the intended performance range of the system.

To select a small-diameter collimated core of laser light beam 14, an iris diaphragm 16 is used to block all of laser light beam 14 except for the laser beam 18 of a size desired for use. In terms of the present invention, the laser beam 18 will have a diameter in the range of approximately 0.5–4.5 mm, with 1–3 mm being typical, by way of example. A badly aberrated eye uses a smaller-diameter beam, while an eye with only slight aberrations can be evaluated with a larger-diameter beam. Depending on the output divergence of the laser 12, a lens can be positioned in the beam path to optimize collimating of the beam.

Laser beam 18, as herein described by way of example, is a polarized beam that is passed through a polarization-sensitive beam splitter 20 for routing to a focusing optical train 22, which operates to focus the laser beam 18 through the optics of the eye 120 (e.g., the cornea 126, pupil 125, and the lens 124) to the retina 122. It is to be understood that the lens 124 may not be present for a patient who has undergone a cataract procedure. However, this does not affect the present invention. In the example of FIG. 1, the optical train 22 images the laser beam 18 as a small spot of light at or near the eye's fovea centralis 123, where the eye's vision is most acute. Note that the small spot of light could be reflected off another portion of retina 122 in order to determine aberrations related to another aspect of one's vision. For example, if the spot of light were reflected off the area of the retina 122 surrounding the fovea centralis 123, aberrations specifically related to one's peripheral vision could then be evaluated. In all cases, the spot of light may be sized to form a near-diffraction-limited image on the retina 122. Thus the spot of light produced by laser beam 18 at fovea centralis 123 does not exceed approximately 100 µm in diameter and, typically, is on the order of 10 µm.

The diffuse reflection of the laser beam 18 back from the retina 122 is represented in FIG. 1 by solid lines 24 indicative of radiation that passes back through the eye 120. The distorted wavefront 24 impinges on and is passed through the optical train 22 and on to the polarization-sensitive beam splitter 20. The wavefront 24 is depolarized relative to the laser beam 18 due to reflection and refraction as the wavefront 24 emerges from the retina 122. Accordingly, the wavefront 24 is turned at the polarization-sensitive beam splitter 20 and directed to a wavefront analyzer 26 such as a Hartmann-Shack (HS) wavefront analyzer. In general, the wavefront analyzer 26 measures the slopes of wavefront 24, i.e., the partial derivatives with respect to x and y, at a number of (x,y) transverse coordinates. This partial derivative information is then used to reconstruct or approximate the original wavefront with a mathematical expression such as a weighted series of Zernike polynomials.

The polarization states for the incident laser beam 18 and the beam splitter minimize the amount of stray laser radiation reaching the sensor portion of the wavefront analyzer 26. In some situations, stray radiation may be sufficiently small when compared to the radiation returning from the desired target (e.g., the retina 122) so that the polarization specifications are unnecessary.

The system 10 is able to adapt to a wide range of vision defects and as such achieves a new level of dynamic range in terms of measuring ocular aberrations. Dynamic range enhancement is accomplished with the optical train 22 and/or a wavefront sensor portion of the wavefront analyzer 26. The optical train 22 includes a first lens 220, a flat mirror 221, a Porro mirror 222, and a second lens 224, all of which lie along the path of laser beam 18 and the wavefront 24. As a preferred embodiment, instead of the Porro mirror 222 a series of static relay optic systems are used to magnify and transfer the aberrated wavefront coming from the eye 120 to the wavefront sensor. The first lens 220 and the second lens 224 are identical lenses maintained in fixed positions. The Porro mirror 222 is capable of linear movement as indicated by arrow 223 to change the optical path length between the lenses 220 and 224. However, it is to be understood that the present invention is not limited to the particular arrangement of the flat mirror 221 and the Porro mirror 222 and that other optical arrangements, as will be described by way of example, will be used without departing from the teachings and benefits of the present invention.

A "zero position" of the Porro mirror 222 is identified by replacing the eye 120 with a calibration source of collimated light to provide a reference wavefront such as a perfect plane wave. Such a source could be realized by a laser beam expanded by a beam telescope to the diameter that will cover the imaging plane of wavefront analyzer 26 and adjustment of the Porro mirror 222 until the wavefront analyzer 26 detects the light as being collimated. Note that the changes in optical path length brought about by the Porro mirror 222 can be calibrated in diopters to provide an approximate spherical dioptric correction.

Figure 2:
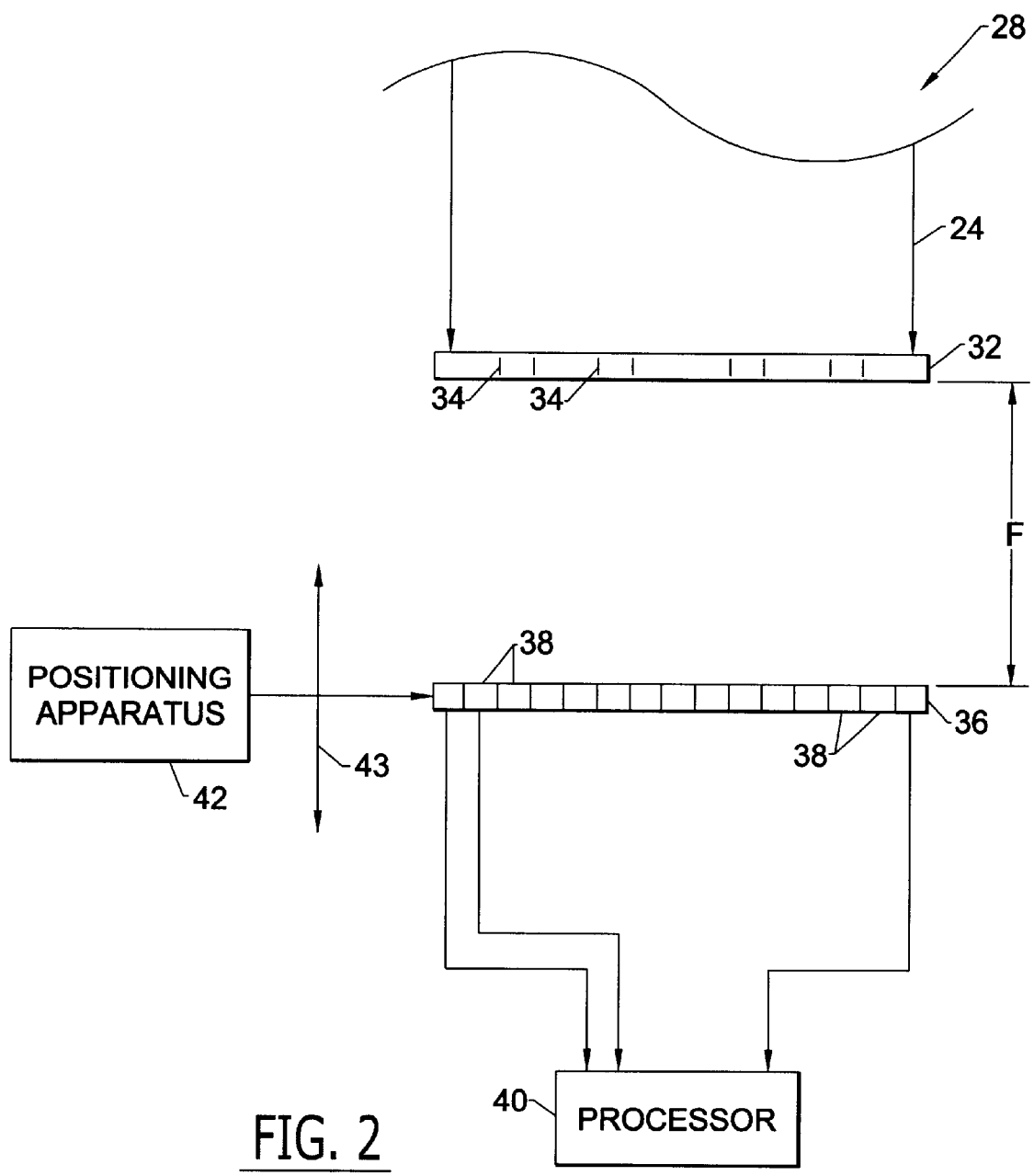
FIG. 2 is a schematic of one embodiment of a Hartmann-Shack wavefront analyzer used in the present invention.
Figure 3:
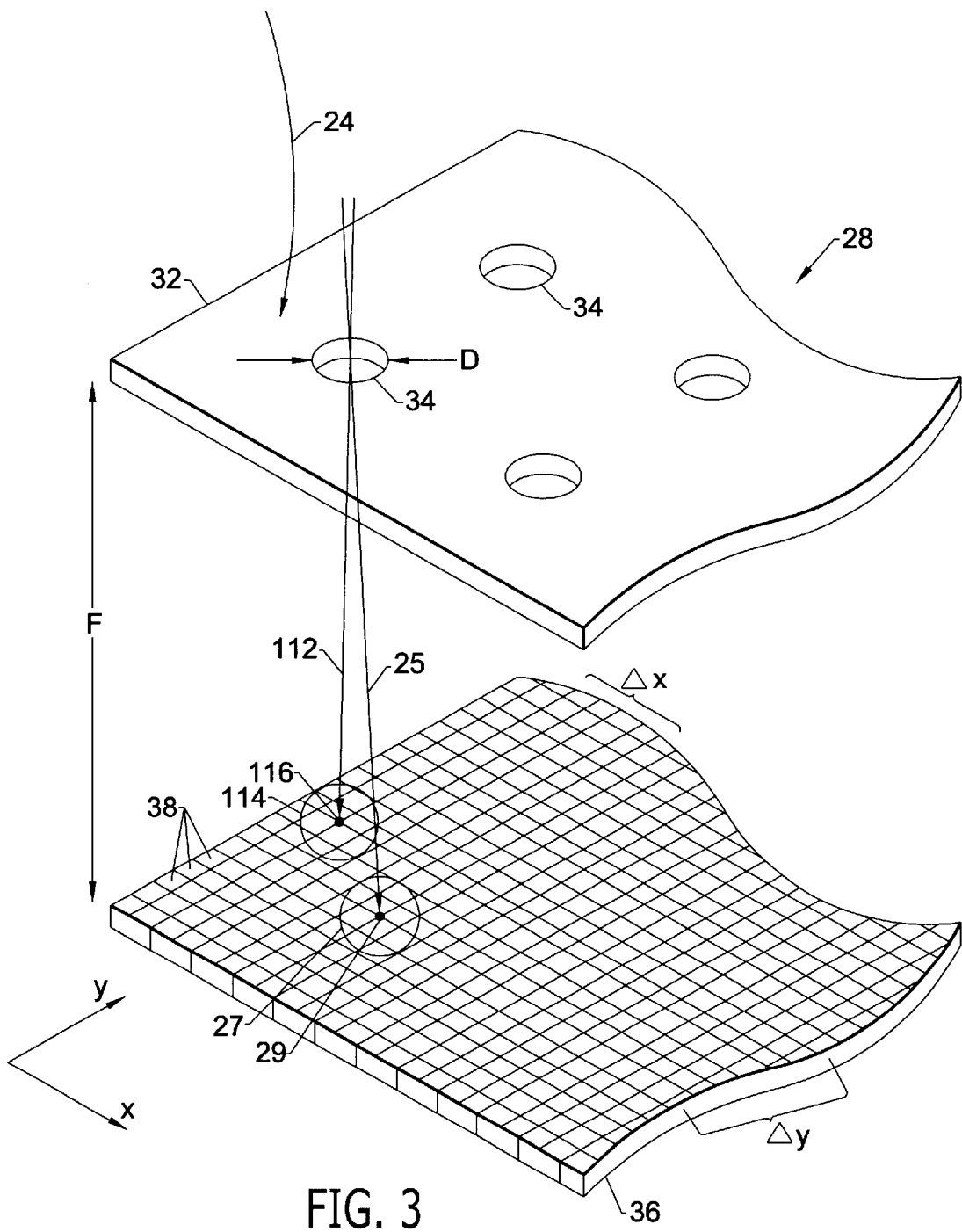
FIG. 3 is a perspective view of a portion of the pinhole imaging plate and planar array of light-sensitive cells comprising the wavefront sensor from the embodiment of FIG. 2, where the deflection of a wavefront piece associated with an aberrated eye is shown in comparison with a wavefront piece associated with a calibration or planar wavefront.
Figure 4:
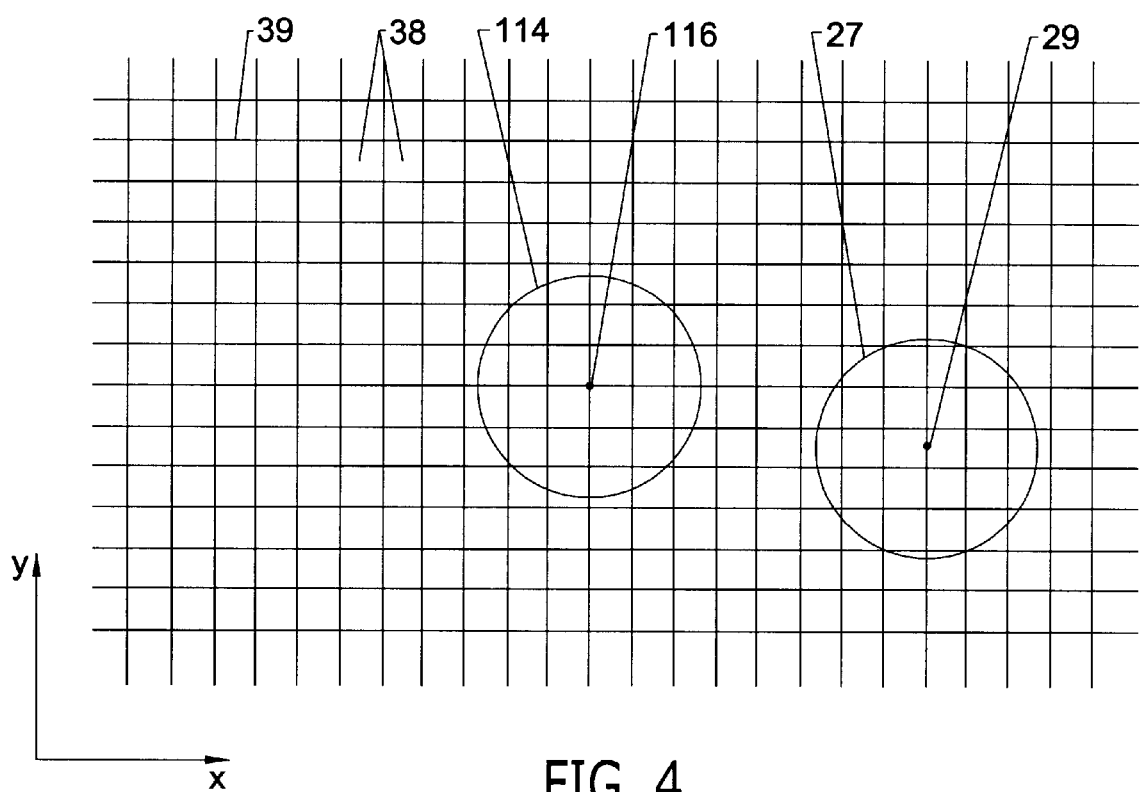
FIG. 4 is a plan view of a designated area on the planar array of light-sensitive cells associated with a corresponding hole.

The dynamic range of the apparatus 10 is further improved by providing an improved wavefront sensor arrangement 28 as illustrated with reference to FIGS. 2 and 3. The wavefront analyzer 26 includes an opaque imaging plate 32 having an array of holes 34 passing therethrough, a planar array 36 of light-sensitive cells such as charge-coupled-device (CCD) cells 38, and a processor 40 operable with the planar array 36 of the CCD cells 38. The plate 32 is held parallel to and spaced from the planar array 36 by a separation distance F. The separation distance F can be varied to adjust for signal gain. To do this, the planar array 36 is coupled to a positioning apparatus 42, e.g., a conventional motorized linear positioner having precise movement capability that adjusts the position of planar array 36 relative to the plate 32 for changing the separation distance F as indicated by arrow 43. With respect to the array of holes 34, each of the holes 34 is of equal size and shape, with a circle being typical owing to its ease of manufacture. As herein described by way of example, a square array geometry is used for the array of holes 34, although other array geometries may be used without departing from the teachings of the present invention.

As illustrated with reference to FIG. 3, when the wavefront 24 impinges on the plate 32, a portion of the wavefront 24, indicated by arrow 25, passes through the hole 34 to illuminate planar array 36. To first order, the resulting image formed by each such wavefront portion 25 is a positive shadow of the respective hole 34. However, diffraction occurs as determined by the diameter D of each hole 34, the wavelength γ of the light source (e.g., the wavefront 24), and the separation distance F between the plate 32 and the planar array 36. The value of F is varied by the positioning apparatus 42 to adjust the gain based on a particular patient.

Note that performance of the plate 32 with holes 34 may also be accomplished using a solid plate or film made from a light-sensitive material such as a photo-lithographic film. In such a case, the array of holes 34 would be replaced by an array of shaped light-transmissive apertures through which light passes when impinging thereon. The remainder of such a plate or film would be impervious to light. Such an embodiment permits the light-transmissive apertures to be easily made to conform to any desired shape.

Regardless of how each wavefront portion 25 is generated, the system 10 measures the amount of angular deflection of each wavefront portion 25 relative to a wavefront portion 112 that results from a calibration wavefront such as the planar wavefront earlier described. The calibration or planar wavefront of light results in the wavefront portion 112 impinging at a normal or perpendicular to plate 32 and illuminates a geometric spot 114 on the planar array 36. In contrast, continuing with the wavefront 24 representing a distorted wavefront as described above, the wavefront portion 25 will exhibit an amount of angular deflection relative to the calibration wavefront portion 112. The angular deflection causes the wavefront portion 25 to illuminate a geometric spot 27 on the planar array 36 that is offset from the spot 114. In terms of the present invention, the amount of offset is measured relative to centroids 116 and 29 of spots 114 and 27, respectively. In the two dimensions of the planar array 36, the centroid 29 is typically deflected in both the x and y directions of the array 36. Thus the angular deflection in each of the x and y directions is given by $\Delta x/F$ and $\Delta y/F$, respectively.

With reference again to FIG. 1, the lenses 220 and 224 in one embodiment are identical as mentioned above. However, in certain applications it may be desirable to magnify or minimize the wavefront at the wavefront sensor. This can be accomplished by using lenses 220 and 224 of different focal lengths and adjusting dimensions of the apparatus 10 accordingly. For ophthalmic evaluation, the object plane of the apparatus should ideally be tangent to the corneal surface, which can be achieved by a variety of means. Thus each point at the object plane of the optical train 22 very nearly corresponds to the same point on the cornea 126. However, since the cornea 126 is curved, there will be a slight lateral displacement. The plate 32 described earlier with reference to FIG. 3 of the wavefront analyzer 26, or an imaging plane of any wavefront sensor portion, is positioned at the focal plane of lens 220. In this way, the object plane is always imaged on the plate 32 in direct correspondence with the wavefront image emerging from cornea 126. This will be true regardless of the optical path length between the lenses 220 and 224. There are several advantages to this structure, one of which is that there are very good planar arrays of light-sensitive cells that are commercially available to image an area corresponding to the 6-mm central circular region of the cornea.

The plate 32 (or the imaging plane of any wavefront sensor portion of a wavefront analyzer) breaks the wavefront 24 into wavefront pieces that can each be measured independently in terms of propagation direction at the planar array 36. Since in an embodiment herein described by way of example, the optical train 22 does not magnify or reduce the image in the object plane, a point at the object plane corresponds to the same point at the image plane of the optical train. With the Porro mirror 222 set at its zero position, the direction each portion of the wavefront 24 traveling toward the object plane is reproduced exactly at the image plane of wavefront analyzer 26. By way of example, if one wavefront portion at a location in the object plane was traveling away from the optical axis at an angle of 20° with respect to the optical axis that is perpendicular to the object plane, the wavefront portion at the same location in the image plane will also be traveling away from the optical axis at an angle of 20°.

Note that a person who is myopic will produce a wavefront such that the wavefront portions/pieces isolated by the plate 32 will converge toward the center of planar array 36. A hyperopic person will produce a wavefront such that the wavefront pieces isolated by the plate 32 diverge. Thus a person with a significant vision error becomes difficult to evaluate because wavefront portions can either overlap (myopia) at the planar array 36 or spill off (hyperopia) the planar array.

In the present invention, five ways of compensating for such severe aberrations are herein described by way of example. The first way is to utilize a wavefront sensor with sufficiently small light-sensitive cells 38 and sufficiently large holes 34 (or any other transmissive aperture). In this way, measurement of each wavefront piece can be performed to an acceptable accuracy using a small value for F. A second way is to move planar array 36 along the optical axis to change the separation distance F to the plate 32. For a person with a severe aberration, the planar array 36 is positioned close to the plate 32 to keep the projected wavefront portions well separated and on the planar array. For a mild aberration, the planar array 36 is moved to increase the separation distance F to the plate 32 to make a more accurate measurement. The advantage of moving the planar array 36 to change the separation distance F to the plate 32 is that the wavefront analysis is easily achieved for any position. Yet another way of compensating for severe aberrations using the present invention is to change the optical path length between lenses 220 and 224. Moving the Porro mirror 222 will not affect where the wavefront hits the plate 32, but will change the angular deflections at which the projected wavefront portions pass through the plate 32, i.e., $\Delta x/F$ and $\Delta y/F$. Decreasing the optical path length between lenses 220 and 224 will tend to pull the wavefront portions toward the center of planar array 36 thereby compensating for hyperopia. Increasing the optical path length between lenses 220 and 224 will tend to spread the wavefront portions toward the edges of the planar array 36, thereby compensating for myopia. The degree to which the angular deflection associated with each wavefront piece is altered is a linear function of its distance off the optical axis and the movement of the Porro mirror 222 from its zero position. A fourth way of compensating for severe aberrations is to insert one or more trial lenses of specified spherocylindrical power at the location of the intermediate focal plane. This serves to reduce or remove low-order aberrations from the wavefront so that displacement of spots at the CCD cells 38 is minimized and accurate evaluation can proceed. The effect of the specified lens addition is then included in the final wavefront reconstruction. A fifth way is to increase the magnification of the wavefront at the wavefront sensor relative to that at the eye. This is accomplished by an appropriate choice of lenses in the relay optic design. Magnification will reduce the slope of the wavefront uniformly, thereby reducing the displacement of each spot at the CCD.

By way of example, to accurately determine the centroid 29 of the spot 27 of light impinging on the planar array 36, a fine structure of cells 38 relative to a spot size is provided. Each spot covers a plurality of cells 38. One method used to determine the centroid 29 of each spot 27 unambiguously with respect to a spot caused by another one of the holes 34, assigns a unique number of cells 38 to each hole 34. The "assigned areas" are designated, as illustrated with reference to FIG. 4, by way of example, with the heavy grid lines 39. It is to be understood that the grid lines 39 are not actual physical boundaries between cells 38 but are shown simply to illustrate the unique designated areas containing a plurality of the cells 38. It is anticipated that other centroid strategies will be utilized that do not necessitate such partitioning of the array 36 given the teachings of the present invention.

Figure 5:
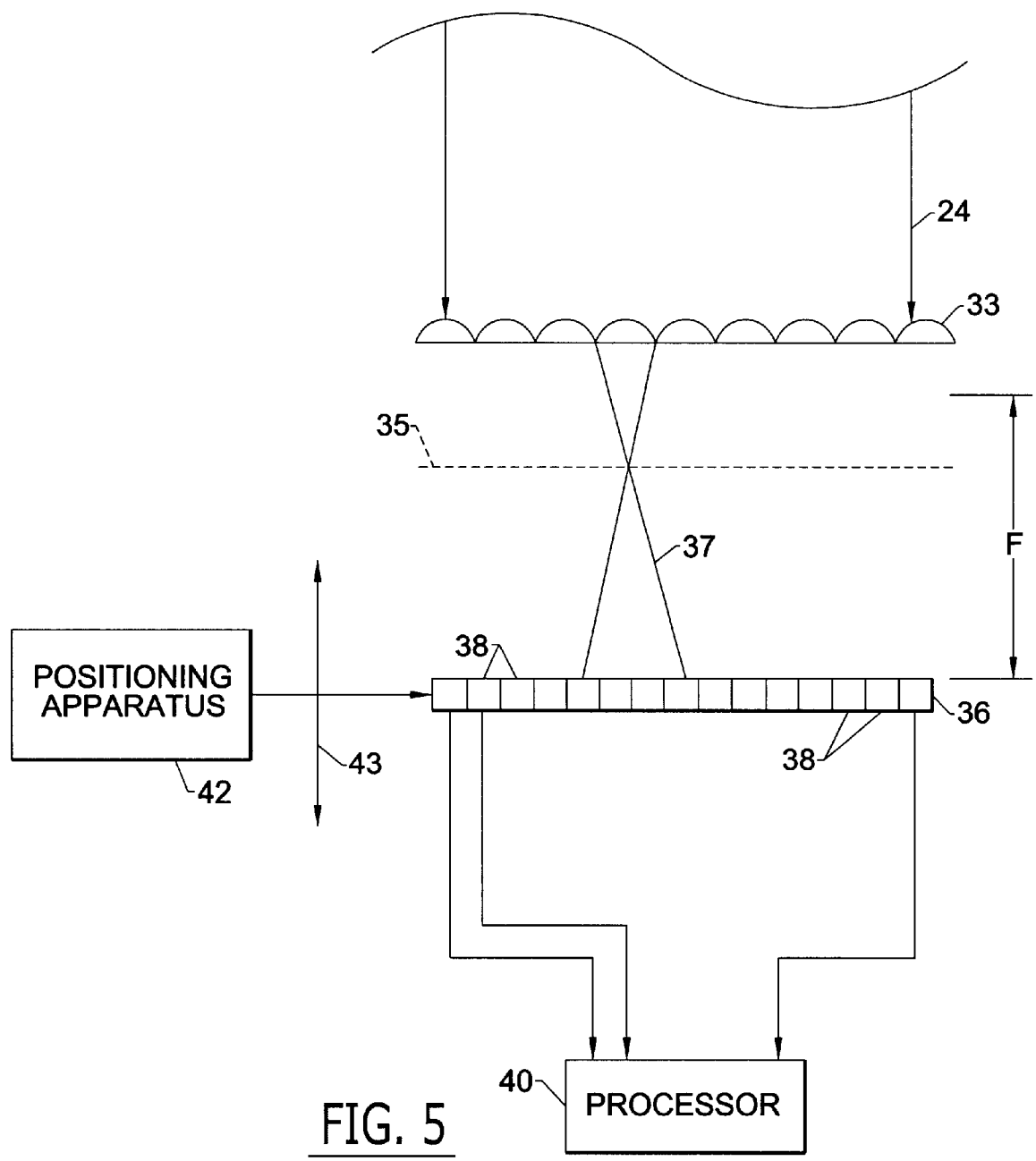
FIG. 5 is a schematic of another embodiment of a wavefront analyzer used in the present invention.
Figure 6:
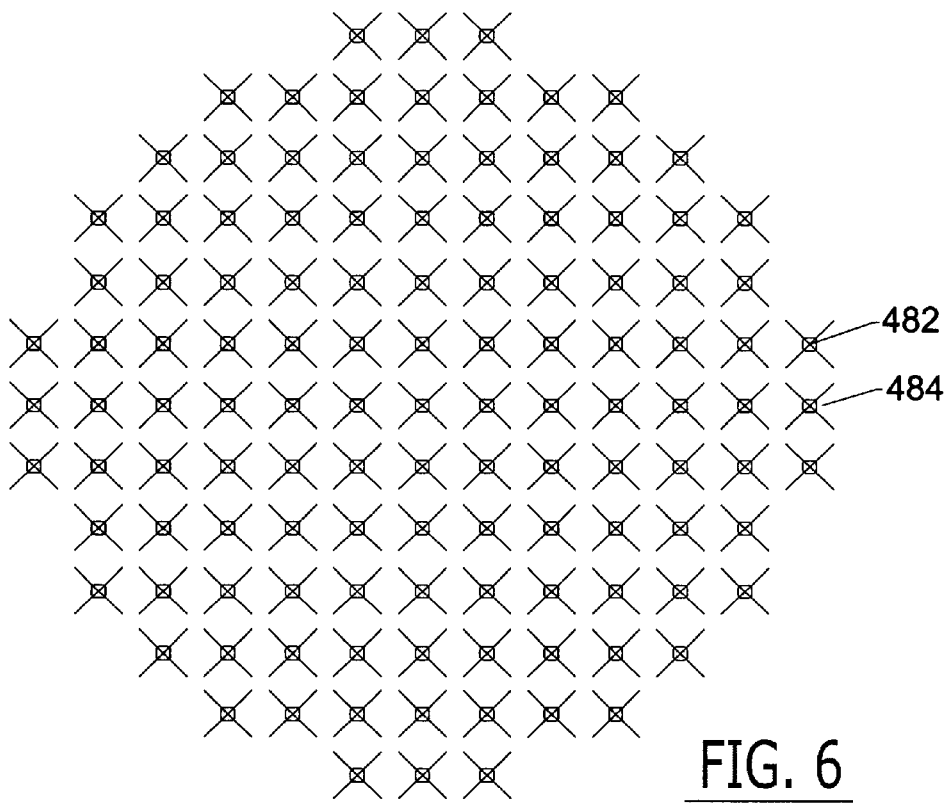
FIG. 6 illustrates a CCD image including centroids.

By way of example, the present invention could also be practiced with a wavefront analyzer that replaces plate 32 described with reference to FIG. 2, with a two dimensional array of identical spherical lenslets 33, as illustrated with reference to FIG. 5. In such an embodiment, the lenslet array 33 may be operable by the positioning apparatus 42 such that separation distance F is independent of the focal length f that defines the focal plane of the lenslet array 33, which is represented by dashed line 35. Each wavefront portion 37 passed through a subaperture of the lenslet array 33 is reduced in size (e.g., diameter) but is not necessarily brought to a minimum focus at the planar array 36 as it would be if separation distance F were equal to focal length f. In the operation of this embodiment configuration, the lenslet array 33 is positioned to concentrate the light in each wavefront portion of an area for providing sufficient intensity onto the planar array 36, yet still illuminating a substantial plurality of cells 38 for greatest accuracy in determining the deflection of the centroids 29.

Regardless of the structure of the wavefront sensor, the processor 40 computes each two-dimensional centroid 29 of each spot 27 generated by the wavefront 24. The amount of two-dimensional centroid shift relative to the centroid of the calibrating spot for each designated area associated with a corresponding hole 34 (or subaperture of lenslet array 33) is divided by the separation distance F to generate a matrix of local slopes of the wavefront, i.e., $\partial W(x, y)/\partial x$ and $\partial W(x, y)/\partial y$ at the (x, y) coordinates of the centers of holes 34. For simplicity of discussion, these will be indicated by $P(x)y)=\partial W(x, y)/\partial x$ and $Q(x, y)=\partial W(x, y)/\partial y$, respectively.

Numerous methods exist for using the partial derivative data to calculate the distorted wavefronts 24. By way of example, the Zernike polynomial approach will be discussed herein. However, it is to be understood that other mathematical approaches can be used in approximating the distorted wavefront. It will be understood by one of ordinary skill in the art that other mathematical approaches can be used in approximating the distorted wavefront. By way of example, such approaches may include the use of Fourier series and Taylor series.

$$W(x, y) = \sum_{i=0}^{n} C_i Z_i(x, y) \quad (2)$$

Briefly, the wavefront W(x,y) is expressed as a weighted sum of the individual polynomials, where $C_i$ are the weighting coefficients, and $Z_i(x,y)$ are the Zernike polynomials up to some order. The upper limit n of the summation is a function of the number of Zernike polynomials, i.e., the highest order, used to approximate the true wavefront. If m is the highest order used, then $$n=(m+1)(m+2)/2 \quad (3)$$

Derivation of the Zernike polynomials up to an arbitrary order n is described in numerous optical texts. One possible method of determining the centroid 29, 116 of a spot 27, 114, respectively, as earlier described with reference to FIGS. 3 and 4, and calculation of the Zernike weighting coefficients will now be explained. The directions of the unit normals at the center of each hole 34 are based on the centroids of the spots on cells 38.

Since each spot will illuminate a plurality of cells varying intensity, a standard amplitude-weighted centroid calculation can be used to find the center of each spot. In order to clearly delineate each centroid from background noise, by way of example, resulting from spurious light reaching the CCD surface between valid spots, standard mathematical techniques such as a matched spatial filter can be applied to the CCD data prior to centroid identification.

An alternative method is herein described for identifying individual spots and correlating their geometry. The apparatus is configured such that the optical axis is aligned to the center of a particular aperture at the entrance face of the wavefront sensor. This aperture is located at or near the center of the entrance face. If the probe beam entering the eye is also aligned to the system optical axis, then due to the reversible nature of light rays, a light spot will always be seen directly behind the aligned aperture. That is, a spot will always be seen on the CCD sensor at this location, regardless of the wavefront aberrations, and will always correspond to the overlying aperture. Immediately adjacent spots will be minimally displaced from their "zero-slope" locations. As one moves farther from the central reference spot, generally greater spot displacements will occur. Using this knowledge, it is a relatively straightforward process to identify all the spots in the CCD pattern and establish their geometric relationships.

The displacement of the centroid from that of a perfectly collimated light beam, corresponding to ideal and emmetropic vision, is then calculated and used to determine the wavefront slope at each sample location. The location of the centroids for a collimated light beam may either be directly measured in a calibration step prior to the patient exam or taken from a calculated reference pattern based on the wavefront sensor construction.

Multiple exposures may be used to check for improper eye alignment or eye movement during individual exposures. If eye movement during exposures cannot be analyzed successfully by acquiring multiple exposures, then the apparatus 10 can be augmented by the addition of an eye tracker 30, illustrated with reference again to FIG. 1. One possible placement of the eye tracker 30 is herein illustrated. However, it is to be understood that the eye tracker 30 could be placed elsewhere within the apparatus 10. One such eye tracker is disclosed in U.S. Pat. No. 5,980,513, commonly owned with the present invention. In this way, wavefront analysis is performed even during a limited amount of eye motion.

A one-time calibration exposure can also be used to determine the relative sensitivities of the individual cells. This is made in uniform collimated light with plate 32 removed. The responses of individual cells are then recorded. For each light-transmissive aperture (e.g, hole 34), the centroid in the collimated case serves as a dedicated origin for the particular hole. The shift from the "origin" for each hole to the centroid caused by the wavefront 24 (as observed in this coordinate system) is determined by the direction of the wave surface corresponding to that hole. If $\Delta x(m,n)$ is the x component of the (m,n)th centroid and F is the plate separation, then the P value for the (m,n)th centroid is:

$$P(m,n)=\partial x(m,n)/\partial z=\Delta x(m,n)/F \quad (4)$$

The corresponding expression for Q is:

$$Q(m,n)=\partial y(m,n)/\partial z=\Delta y(m,n)/F \quad (5)$$

Thus each P(m,n) and Q(m,n) represents the partial derivatives of W(x,y) with respect to x and y for the (x,y) coordinates of each hole 34. For an m-order Zernike approximation of the original wavefront, the experimentally determined Ps and Qs are then used in the following equations to calculate the appropriate $C_i$ weighting coefficients as follows:

$$P(m, n) = \frac{\partial W(x, y)}{\partial x} = \sum_{i=0}^{n} C_i \frac{\partial Z_i(x, y)}{\partial x} \quad (6)$$

$$Q(m, n) = \frac{\partial W(x, y)}{\partial x} = \sum_{i=0}^{n} C_i \frac{\partial Z_i(x, y)}{\partial x} \quad (7)$$

By using a least-squares approximation (m,n)/$\partial z$ to minimize the error between the actual wavefront slopes on the left-hand side in the above equations and the Zernike approximations on the right-hand side, optimal values for the weighting coefficients can be obtained.

In one possible approach to calculating a centroid $(x_c, y_c)$, each hole 34 is assigned its dedicated area of the array 36 or ($i_{m,n} \pm \Delta i, j_{m,n} \pm \Delta j$). This square of many light-sensitive cells is large enough that neighboring hole images never encroach, and all illumination from this hole is contained. The square contains $4\Delta i * \Delta j$ cells.

If array 36 is designated $C_{k,l}=(x_c(i,j), y_c(i,j))$, $k,l=0, \ldots$, $2\Delta i, 2\Delta j$, and the spacing on centers is $\Delta x = \Delta y = d$, the measured cell responses are $V(k,l)$ and the relative responsivities are $R(k,l)$, then the x component $x_c$, a function of i,j is represented by $$x_c(i,j)=[\Sigma_{k,l} V(k,l)*R(k,l)*d*k]/[\Sigma_{k,l} V(k,l)*R(k,l)] \quad (8)$$

and the y component $y_c$, as a function of i,j is represented by $$y_c(i,j)=[\Sigma_{k,l} V(k,l)*R(k,l)*d*l]/[\Sigma_{k,l} V(k,l)*R(k,l)] \quad (9)$$

Then, if $(x_{c0}(i,j), y_{c0}(i,j))$ is the "origin centroid" for the (i,j) hole, i.e., made in perpendicular collimated light, and $(x_{cw}(i,j), y_{cw}(i,j))$ is the corresponding centroid found for the wavefront to be measured, then the relative centroid shift $(x_{cr}(i,j), y_{cr}(i,j))$ is found as $$x_{cr}(i,j)=x_{cw}(i,j)-x_{c0}(i,j) \quad (10)$$

$$y_{cr}(i,j)=y_{cw}(i,j)-y_{c0}(i,j) \quad (11)$$

The values P(i,j) and Q(i,j) are determined from $$P(i,j)=x_{cr}(i,j)/F \quad (12)$$

and $$Q(i,j)=y_{cr}(i,j)/F \quad (13)$$

The surface partial derivatives P(i,j) and Q(i,j) for the array of hole centers of plate 32 are next used to calculate the appropriate Zernike polynomial weighting coefficients to describe the original wavefront W(x,y). This will now be explained by way of illustration for a 7×7 square array of holes 34. However, it is to be understood that other sizes and shapes of hole arrays could be used.

First, a 1×98 matrix (i.e., column vector) PQ(k) is formed as $$PQ(k)=P(7i+j), j=0\ldots 6, i=0\ldots 6, k=0\ldots 48 \quad (14)$$

$$PQ(k)=Q(7i+j), j=0\ldots 6, i=0\ldots 6, k=49\ldots 98 \quad (15)$$

with j cycling for each i, i.e., PQ(18)=P(2,5).

The matrix PQ is multiplied from the left with a transition matrix TM to get the matrix C as follows $$C=TM*PQ \quad (16)$$

where TM is a 98 wide by 14 high matrix and C is a 1 wide by 14 high matrix or column vector. C is the matrix $C_k$, $k=1, \ldots, 14$ such that, to a least-squares error, $$W(x,y)=\Sigma_k C_k * Z_k(x,y) \quad (17)$$

and TM is calculated for a given aperture, e.g., a 6-mm pupil aperture. The functions $Z_k(x,y)$ in Eq. (16) are the Zernike polynomials. There is no standard convention as to their sequence. Thus, for consistency, it is important that the same sequence is used to produce the set $C_k$ that was chosen for deriving the matrix TM. They occur in groups of the same order, which is the highest exponent in the group, with the total number of members in an order increasing with the order. For example, in a fourth-order analysis, orders up to and including 4 are used (less $Z_0$—the single member of order 0 that is the constant 1, which describes the reference position of the group in the z direction). Since wavefront 24 is moving along z (at the velocity of light), this "piston term" describes only an arbitrary offset in Z, and this term may be ignored. The first 5 orders (0, 1, . . . , 4) contain 15 functions, including the piston term.

Thus, in the illustrated example, 14 values of $C_k$ are calculated as coefficients of 14 Zernike polynomials. Further details of such calculations may be referenced in the incorporated application Ser. No. 09/566,668.

Figure 7:
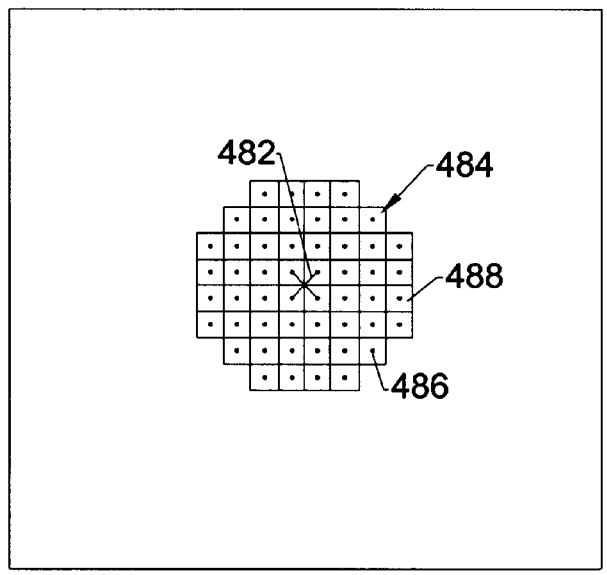
FIG. 7 is an enlarged image of a centroid.
Figure 8:
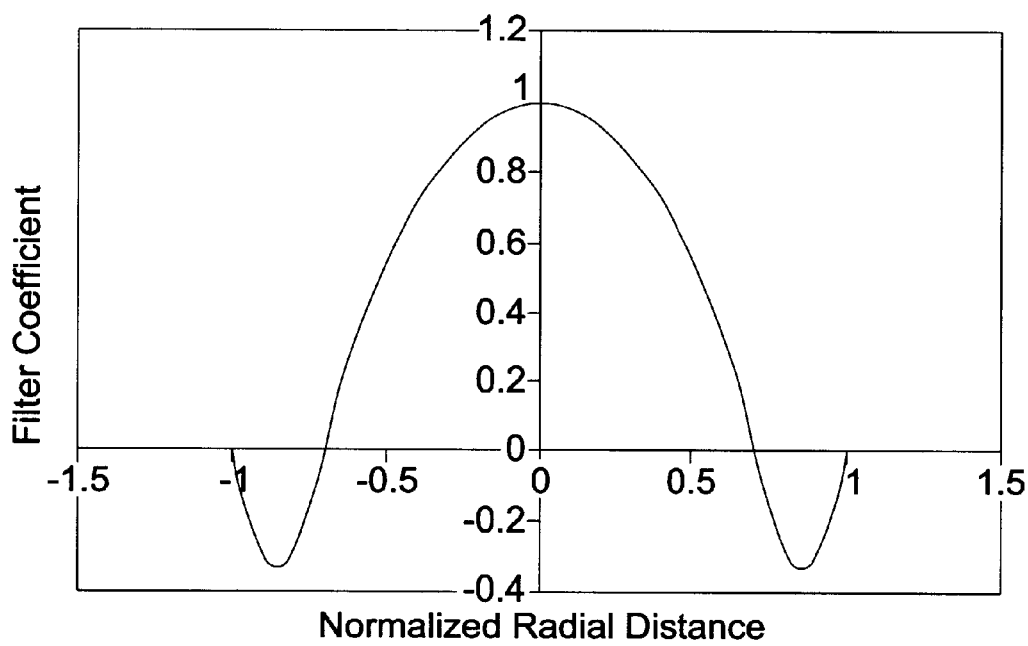
FIG. 8 illustrates a spatial filter operable in one embodiment of the present invention.

Once a valid measurement of an eye has been made, the next step is to measure the local slopes of the wavefront 130, as earlier described. As described with reference to FIGS. 3–5, it is necessary for the software to compute the centroids 116 of the clusters of light on the CCD array 38 and then determine the distances of $$PQ(k)=P(7i+j), j=0\ldots 6, i=0\ldots 6, k=0\ldots 48 \quad (14)$$

each of these centroids 116 from the corresponding reference centroids 29. The centroids are determined by first computing which pixels should be processed and grouping them together into clusters. The intensity-weighted centroid of each cluster is then computed. As illustrated with reference to FIG. 6, an example of an image from a myopic eye with the computed centroids 482 of cluster 484 marked by "X"s is shown. FIG. 7 illustrates a closeup of one of the clusters 484 and displays not only the centroid 482 but also the pixels 486 used in the centroiding calculation for the cluster 484. CCD pixels 488 processed in the centroiding algorithm are marked by dots. This algorithm, by way of example, isolates centroids by use of a spatial filter that removes stray light signals that create noise for the CCD image. Such filtering may be desirable before calculation of light cluster positions.

Without filtering, computation of the cluster centroids may be made difficult as a result of one or more potential problems: Noise on the image such that individual pixels with no actual data content may be brighter than pixels containing relevant data; speckle in the image may result in valid data clusters having irregular profiles with significant variation in intensity of adjacent pixels; haze or background noise may be high relative to the actual data or may be nonuniform across the image; intensity of valid data may be nonuniform across the image; scatter from different parts of the eye may result in spurious signals on the image; and high levels of aberrations in the eye may significantly distort the clusters of valid data, by way of example.

Figure 13:
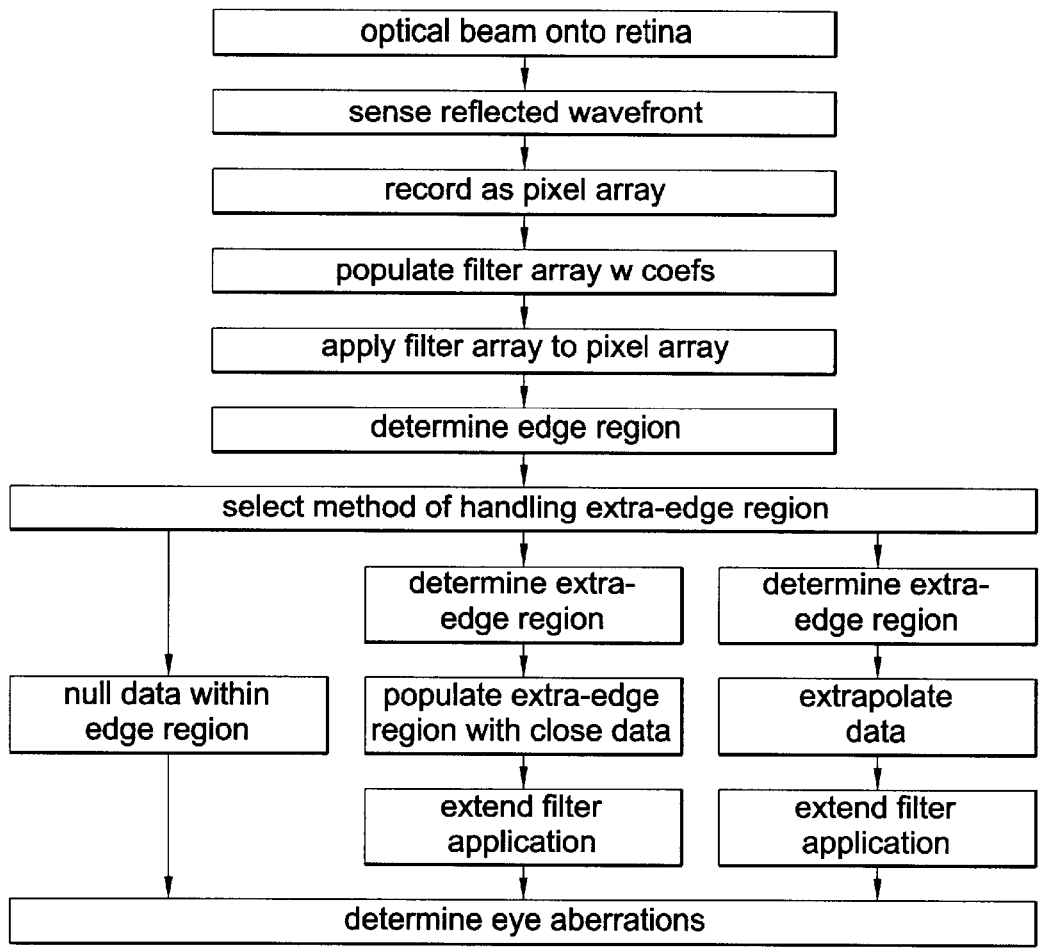
FIG. 13 is a flow chart of the application of the spatial filter to image data.

The creation and application of a spatial filter of the present invention is shown in flowchart form in FIG. 13. The spatial filter permits a recomputation of the brightness of each pixel in a bitmap using a weighted-averaging technique that considers surrounding pixels. In a particular application herein described for illustration and by way of example, the spatial filter is designed to: yield a maximum value when centered on valid data; reduce an effect of individual bright pixels or small groups thereof; normalize background levels; smooth valid data profiles; and simplify the task of extracting the valid data from background noise or haze.

The spatial filter is embodied in a software package 261 resident on a processor 262, which in turn is part of the wavefront analyzer 26 (FIG. 1). Another software package 263 resident on the processor 262 determines aberrations in the eye based upon the filtered image data, as discussed in application Ser. No. 09/566,668.

A filter employed in one embodiment of the present invention is square (n×n) and includes real values (positive and negative) assigned to each pixel. The filter is designed to be optimally matched to images obtained from eyes with high, yet measurable, levels of aberration. By way of example, a cross-section through the filter is illustrated with reference to FIG. 8. An effect of applying such a filter improves an image 500 such as illustrated with reference to FIG. 9 to the image 500 illustrated in FIG. 10, by way of example, a cleaner image and one that is easily processed for identification and computation of cluster centroids. By applying the filter, images that would otherwise be deemed too noisy or of insufficient quality to process, can now be processed and desired wavefront information computed.

Figure 11:
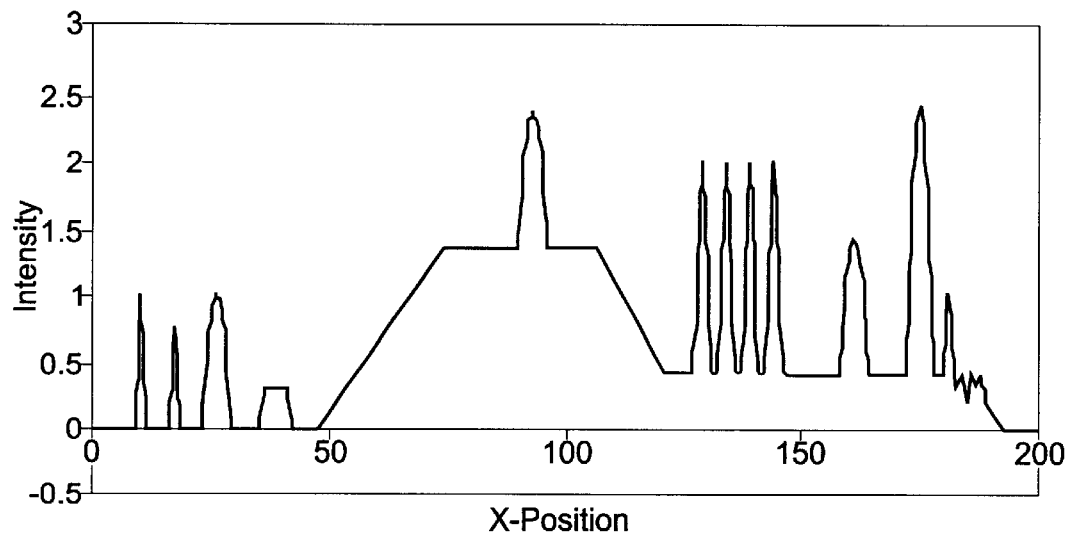
FIG. 11 is a two-dimensional sample of unfiltered data.
Figure 12:
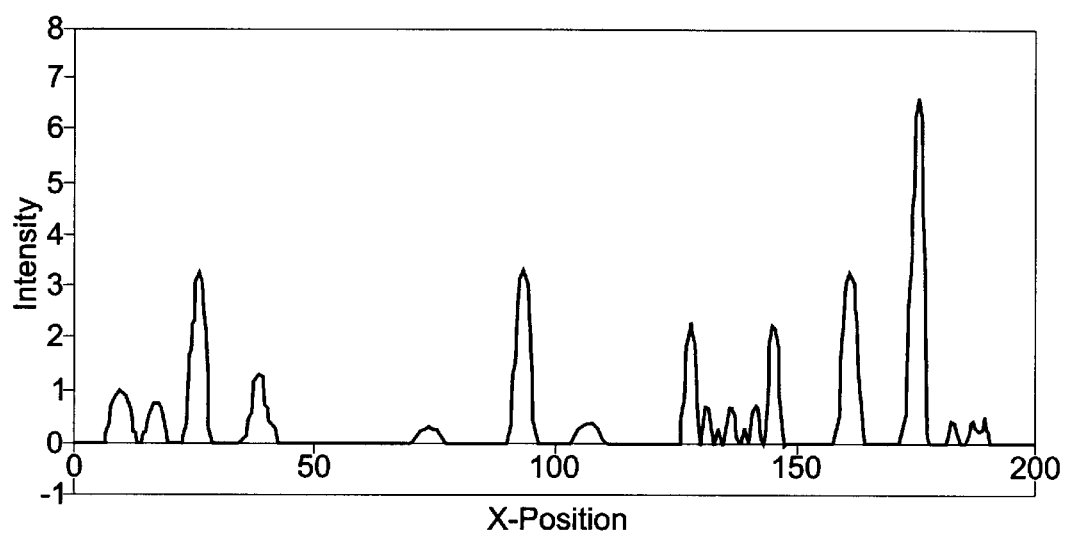
FIG. 12 illustrates the output of applying the spatial filter to the data of FIG. 11.

To illustrate the effect of applying this filter, a two-dimensional variant is applied to the image of FIG. 11 to yield the output of FIG. 12. An analysis of exemplary FIG. 11 yields several insights:

1. Valid data exist around locations 26, 93, 161, and 175 and are of an expected profile (i.e., the same profile as the filter).
2. Noise spikes of varying magnitude are present at 10, 17, 129, 134, 139, 144, and 181. (Note: those between 129 and 144 inclusive are wider and are not truly spikes.)
3. The background level varies across the plot.

It may be seen, therefore, that it is not possible to define a single threshold that would be exceeded by the valid data intensities and yet not by the noise and other unwanted data such as the high background levels in the middle of the plot. The result of applying a two-dimensional spatial filter (i.e., one similar to the profile shown in FIG. 8) to these data is shown in FIG. 12. Note that with a two-dimensional filter the coefficients at the edges have less effect than with a three-dimensional filter, and so the magnitudes of the coefficients need to be increased accordingly. In this particular case the negative values at the edges need to be more negative.

In FIG. 12 the highest values correspond to the valid data locations. The problem of varying background levels has been removed and the use of a simple threshold can uniquely identify the locations of valid data.

Figure 9:
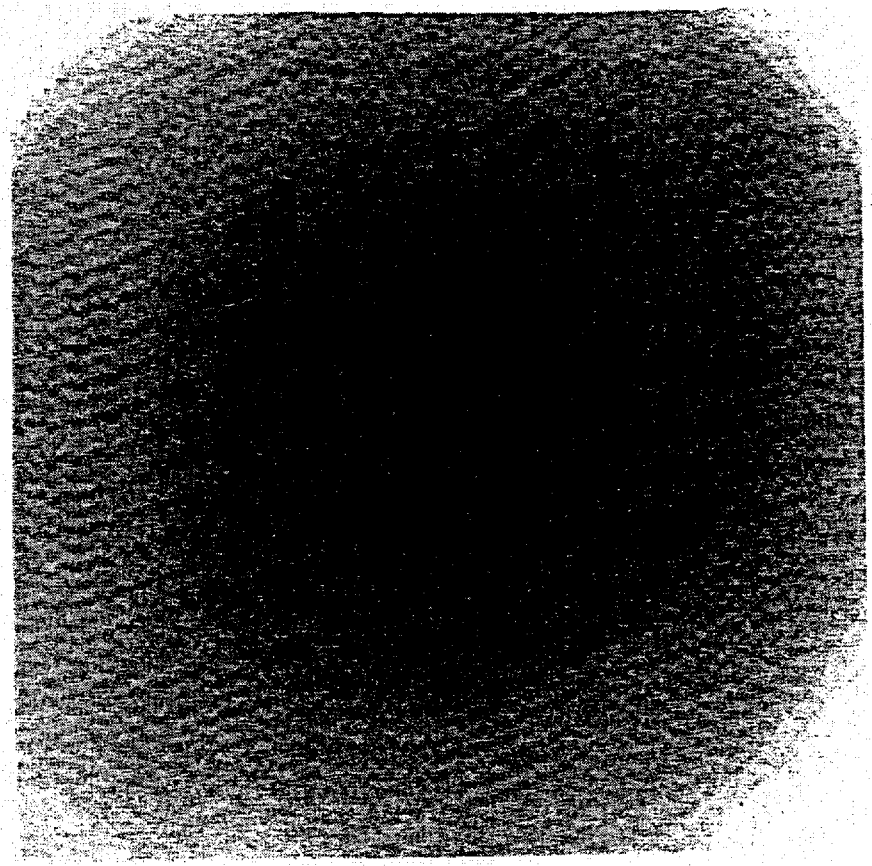
FIG. 9 illustrates a noisy CCD image before filtering to provide an image as illustrated with reference to FIG. 6.
Figure 10:
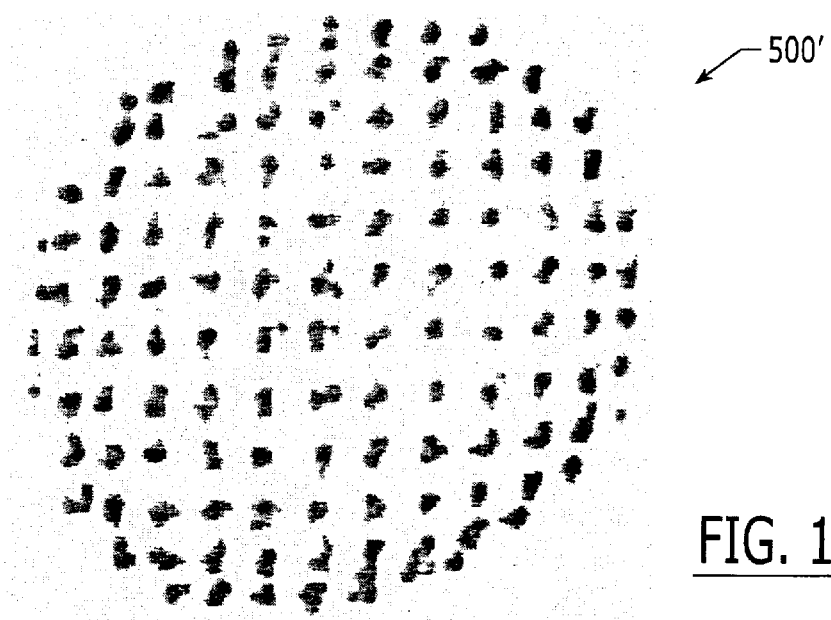
FIG. 10 is an exemplary Hartmann-Shack wavefront image after applying a spatial filter.

The three-dimensional filter (with coefficients at n×n×y locations) works in a very similar manner to yield the intensities shown in FIG. 10 from those in FIG. 9.

The procedure by which the spatial filter is applied will now be described:

1. The filter is created by populating an n×n array with the required coefficients. Note that a square array is used, but the coefficients are such that it is approximately radially symmetric.
2. The new intensities are computed at all locations from a combination of the filter coefficients and the original intensities using the following exemplary iterative approach: initialize new intensities to 0

--- for all x locations (lx) to process in image
... for all y locations (ly) to process in image
... ... for filter x offset (Fx) from −n/2 to +n/2
... ... ... for filter y offset (Fy) from −n/2 to +n/2
... ... ... ... newXaddress = lx + Fx
... ... ... ... newYaddress = ly + Fy
... ... ... ... delta Intensity = filter coefficient(Fx,Fy) * Original Intensity (newXaddress, newYaddress)
... ... ... ... new intensity(lx,ly) = new intensity(lx,ly) + delta intensity
... ... ... end
... ... end
... end
end

---

Note the terminology "for all x locations (lx) to process an image." It is not possible to apply the spatial filter in the normal way when the target pixel is closer than n/2 pixels to an edge, since the algorithm would attempt to address nonexistent data.

There are a number of ways to address this:

1. Zero or null out all data within this edge region.
2. Allow filter to run all the way out to the edge and for data beyond the image assuming that it is of the same intensity as the data closest to this location at the edge of the image.
3. Extrapolate beyond the image (linearly or otherwise) to compute data so that the filter may be used out to the edge of the image.

In summary, by applying filters of the kind described here, images that would otherwise be deemed too noisy or of insufficient quality to process can be processed and the required wavefront information computed.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for improving a quality of sensor image data, the method comprising the steps of:

receiving sensor image data, the sensor image data comprising a pixel array of intensities being derived from a wavefront emanating from an eye;

populating a filter array with a coefficient at each position of the array;

the coefficient at each position of the array being selected to highlight a wavefront portion profile within the image data; and applying the filter to each position in the pixel array in order to detect the wavefront portion profiles within the image data.

2. The method recited in claim 1, wherein the filter array comprises a square n×n array.

3. The method recited in claim 1, further comprising the steps of:

determining an edge region within a predetermined distance from an edge of the pixel array; and nulling all data within the edge region.

4. The method recited in claim 1, further comprising the steps of:

determining an edge region within a predetermined distance from an edge of the pixel array;

determining an extra-edge region outside the pixel array;

populating the extra-edge region with data substantially equivalent to a closest location within the pixel array; and extending the applying of the filter array to include the extra-edge region.

5. The method recited in claim 1, further comprising the steps of:

determining an extra-edge region outside the pixel array;
extrapolating data into the extra-edge region from at least two pixels closest to each pixel in the extra-edge region; and
extending the applying of the filter array to include the extra-edge region.

6. The method recited in claim 1, wherein:
the coefficient for a given position within the filter array comprises a weighted average of pixels within an area of the sensor image data around a given pixel which corresponds to the given position;
the area of the sensor image data being defined by the wavefront portion profile; and
the weighted average of pixels having a two-dimensional cross-section generally described by:
 a highest positive real value at the given pixel,
 a downward slope of values for pixels on either side of the given pixel crossing a zero value to end in a highest negative real value for pixels adjacent an edge of the area, and
 an upward slope of values from the highest negative value to a zero value for pixels at the edge of the area.

7. The method recited in claim 6, wherein the wavefront portion profile comprises a spot profile and the area is defined such that the edge of the area is at a distance from the given pixel equal to a radius of the spot profile.

8. The method recited in claim 1, further comprising determining aberrations in the wavefront emanating from the eye.

9. The method recited in claim 8, further comprising determining optical corrections based on the aberrations in the wavefront emanating from the eye.

10. The method recited in claim 1, wherein the wavefront portion profile comprises a spot profile.

11. A wavefront analyzer for improving a quality of sensor image data, the wavefront analyzer comprising:
means for receiving the sensor image data, the sensor image data comprising a pixel array of intensities being derived from a wavefront emanating from an eye;
means for populating a filter array with a coefficient at each position of the array;
the populating means selecting the coefficient at each position of the array to highlight wavefront portion profiles within the image data; and
means for applying the filter array to each position in the pixel array in order to detect the wavefront portion profiles within the image data.

12. The wavefront analyzer as recited in claim 11, wherein the filter array comprises a square n×n array.

13. The wavefront analyzer as recited in claim 11, further comprising;
means for determining an edge region within a predetermined distance from an edge of the pixel array; and
means for nulling all data within the edge region.

14. The wavefront analyzer as recited in claim 11, further comprising:
means for determining an edge region within a predetermined distance from an edge of the pixel array;
means for determining an extra-edge region outside the pixel array;
means for populating the extra-edge region with data substantially equivalent to a closest location within the pixel array; and
means for extending the applying means to include the extra-edge region.

15. The wavelength analyzer as recited in claim 11, further comprising:
means for determining an extra-edge region outside the pixel array;
means for extrapolating data into the extra-edge region from at least two pixels closest to each pixel in the extra-edge region; and
means for extending applying means to include the extra-edge region.

16. The wavefront analyzer recited in claim 11, wherein:
the coefficient for a given position within the filter array comprises a weighted average of pixels within an area of the sensor image data around a given pixel that corresponds to the given position;
the area of the sensor image data being defined by the wavefront portion profile; and
the weighted average of pixels having a two-dimensional cross-section generally described by:
 a highest positive real value at the given pixel,
 a downward slope on either side of the given pixel crossing a zero value to end in a highest negative real value for pixels adjacent an edge of the area, and
 an upward slope of values from the highest negative value to a zero value for pixels at the edge of the area.

17. The system recited in claim 16, wherein the wavefront portion profile comprises a spot profile and the area is defined such that the edge of the area is at a distance from the given pixel equal to a radius of the spot profile.

18. The wavelength analyzer as recited in claim 11, wherein the wavefront analyzer comprises a Hartmann-Shack wavefront analyzer.

19. The system recited in claim 11, wherein the wavefront portion profile comprises a spot profile.

20. A method for determining aberrations of an eye, comprising the steps of:
directing an optical beam onto a retina of an eye;
reflecting the optical beam from the retina;
sensing a wavefront in a reflected optical beam;
recording the sensed wavefront as a pixel array;
applying a spatial filter to the pixel array to create filtered image data having improved quality in order to detect wavefront portion profiles within the image data; and
determining aberrations of the eye based upon the filtered image data.

21. The method recited in claim 20, further comprising the step of populating a filter array with a coefficient at each position of the array to form the spatial filter.

22. The method recited in claim 20, wherein:
the coefficient for a given position within the filter array comprises a weighted average of pixels within an area of the sensor image data around a given pixel which corresponds to the given position;
the area of the sensor image data being defined by a wavefront portion profile; and
the weighted average of pixels having a two-dimensional cross-section generally described by:
 a highest positive real value at the given pixel,
 a downward slope of values for pixels on either side of the given pixel crossing a zero value to end in a highest negative real value for pixels adjacent an edge of the area, and
 an upward slope of values from the highest negative value to a zero value for pixels at the edge of the area.

23. The method recited in claim 22, wherein the wavefront portion profile comprises a spot profile.

24. The method recited in claim 22, wherein the wavefront portion profile comprises a spot profile and the area is defined such that the edge of the area is at a distance from the given pixel equal to a radius of the spot profile.

25. The method recited in claim 20, wherein:

sensing the wavefront comprises separating the wavefront into a plurality of wavefront portions;

recording the sensed wavefront comprises recording the wavefront portions as the pixel array;

applying the spatial filter comprises applying the spatial filter to highlight wavefront portion profiles within the pixel array; and determining aberrations comprises detecting the wavefront portion profiles within the pixel array.

26. A system for determining aberrations of an eye comprising:

means for directing an optical beam onto a retina of an eye;

means for sensing a wavefront from an optical beam reflected from the retina;

means for recording the sensed wavefront as a pixel array;

means for applying a spatial filter to the pixel array to create a filtered image having improved quality in order to detect wavefront portion profiles within the image data; and means for determining aberrations of the eye based upon the filtered image data.

27. The system recited in claim 26, wherein the applying means further comprises means for populating a filter array with a coefficient at each position of the array to form the spatial filter.

28. The system recited in claim 26, wherein the sensing means comprises a camera.

29. The system recited in claim 19, wherein the camera comprises a charge-coupled-device camera.

30. The system recited in claim 29, wherein the directing means comprises an eye-safe laser.

31. The system recited in claim 26, wherein:

the sensing means comprises means for separating the wavefront into a plurality of wavefront portions;

the recording means comprises means for recording the wavefront portions as the pixel array;

the applying means comprises means for applying the spatial filter to highlight wavefront portion profiles within the pixel array; and the determining means comprises means for detecting the wavefront portion profiles within the pixel array.

32. The system recited in claim 31, wherein the wavefront portion profile comprises a spot profile.

33. The system recited in claim 31, wherein the wavefront portion profile comprises a spot profile and the area is defined such that the edge of the area is at a distance from the given pixel equal to a radius of the spot profile.

34. The system recited in claim 26, wherein:

the coefficient for a given position within the filter array comprises a weighted average of pixels within an area of the pixel array around a given pixel which corresponds to the given position;

the area of the pixel array data being defined by a wavefront portion profile; and the weighted average of pixels having a two-dimensional cross-section generally described by:

a highest positive real value at the given pixel, a downward slope of values for pixels on either side of the given pixel crossing a zero value to end in a highest negative real value for pixels adjacent an edge of the area, and an upward slope of values from the highest negative value to a zero value for pixels at the edge of the area.

* * * * *

UNITED STATES PATENT AND TRADEMARK OFFICE
CERTIFICATE OF CORRECTION

PATENT NO.     : 6,598,973 B2
DATED          : July 29, 2003
INVENTOR(S)    : John Alfred Campin It is certified that error appears in the above-identified patent and that said Letters Patent is hereby corrected as shown below:

Column 5,
Line 42, delete "centralls" insert -- centralis --

Column 11,
Line 14, delete "P(x)y)=" insert -- P(x,y)= --

Column 13,
Line 6, delete "$\Delta x - \Delta y = d$" insert -- $\Delta x = \Delta y = d$ --

Column 15,
Line 38, delete "nxnxy" insert -- n x n  x,y --

Column 18,
Line 21, delete "a downward slope on" insert -- a downward slope of values for pixels --

Signed and Sealed this

Ninth Day of March, 2004

JON W. DUDAS
*Acting Director of the United States Patent and Trademark Office*